(12) United States Patent
Khoshkava et al.

(10) Patent No.: US 10,748,389 B2
(45) Date of Patent: Aug. 18, 2020

(54) DAMPING FOR A HAPTIC ACTUATOR

(71) Applicant: IMMERSION CORPORATION, San Jose, CA (US)

(72) Inventors: Vahid Khoshkava, Montreal (CA); Juan Manuel Cruz Hernandez, Montreal (CA); Danny A. Grant, San Jose, CA (US); Kaniyalal Shah, San Jose, CA (US); Christopher Ullrich, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/010,319

(22) Filed: Jun. 15, 2018

(65) Prior Publication Data

US 2019/0385420 A1    Dec. 19, 2019

(51) Int. Cl.
 *G08B 6/00* (2006.01)
 *G06F 3/01* (2006.01)
(52) U.S. Cl.
 CPC .............. *G08B 6/00* (2013.01); *G06F 3/016* (2013.01)
(58) Field of Classification Search
 None
 See application file for complete search history.

(56) References Cited

U.S. PATENT DOCUMENTS 4,171,873 A * 10/1979 Repay ................. G02B 7/1824
                                                        248/479
5,150,875 A *  9/1992 Holloway, III ........... F16F 7/10
                                                        188/378
9,564,029 B2 *  2/2017 Morrell .................... G08B 6/00
10,319,200 B2   6/2019 Khoshkava et al.
10,343,061 B2 * 7/2019 Billington
2002/0149561 A1* 10/2002 Fukumoto .......... G01C 21/3664
                                                        345/156
2005/0134149 A1*  6/2005 Deng .................... H01L 41/113
                                                        310/339

(Continued)

FOREIGN PATENT DOCUMENTS

EP            3217269 A1    9/2017
KR      20100083248 A       7/2010

OTHER PUBLICATIONS

TDK, "Piezo Haptic Actuator—PowerHap," Product Sheet, Jul. 28, 2017, 8 pages.

*Primary Examiner* — Chico A Foxx
(74) *Attorney, Agent, or Firm* — Nath, Goldberg & Meyer; Gregory B. Kang; Stanley N. Protigal (57) ABSTRACT

An apparatus and method for damping haptic vibrations. A haptic output device is positioned within a device housing. The haptic output device has a haptic actuator and a haptic mass, the haptic mass being movable relative to the housing. A damper is positioned within the device housing. A controller is programmed to generate and deliver a haptic signal to the haptic actuator at a first time, and to generate and deliver a damping signal to the damper at a second time, the second time occurring after the first time. The method comprises moving a haptic mass, the haptic mass position in a housing; vibrating the housing in response to moving the haptic mass; damping movement of the haptic mass after a period of time; and substantially eliminating vibration of the housing in response to damping movement of the haptic mass.

45 Claims, 7 Drawing Sheets

(56) References Cited

U.S. PATENT DOCUMENTS

| | | | |
|---|---|---|---|
| 2007/0068756 A1* | 3/2007 | Huston | F16F 7/1005 188/378 |
| 2008/0029368 A1* | 2/2008 | Komori | B60L 13/04 198/619 |
| 2008/0225253 A1* | 9/2008 | Binnard | H02K 41/031 355/53 |
| 2010/0101906 A1* | 4/2010 | Herold | F16F 7/1011 188/379 |
| 2010/0245254 A1* | 9/2010 | Olien | G06F 3/016 345/173 |
| 2010/0296691 A1* | 11/2010 | Komatsu | H04R 7/26 381/413 |
| 2011/0005344 A1* | 1/2011 | Haevescher | F16H 59/02 74/473.12 |
| 2011/0163985 A1* | 7/2011 | Bae | G06F 3/016 345/173 |
| 2011/0181209 A1* | 7/2011 | Murata | H02P 3/20 318/128 |
| 2013/0033129 A1* | 2/2013 | Hong | H02K 33/18 310/25 |
| 2013/0300255 A1* | 11/2013 | Yun | H03H 9/1007 310/323.01 |
| 2014/0247227 A1* | 9/2014 | Jiang | G06F 3/016 345/173 |
| 2014/0268515 A1* | 9/2014 | Smoot | G06F 3/03546 361/679.01 |
| 2016/0172953 A1 | 6/2016 | Degner et al. | |
| 2016/0175711 A1* | 6/2016 | Billington | G06F 3/016 463/38 |
| 2016/0179200 A1* | 6/2016 | Billington | G06F 3/016 345/173 |
| 2016/0202764 A1* | 7/2016 | Kamata | G06F 3/04883 715/702 |
| 2017/0280217 A1* | 9/2017 | Choi | H04N 5/642 |
| 2017/0280246 A1* | 9/2017 | Choi | H04N 5/642 |
| 2018/0123437 A1 | 5/2018 | Khoshkava et al. | |
| 2018/0190085 A1* | 7/2018 | Khoshkava | B06B 1/045 |
| 2018/0239432 A1* | 8/2018 | Hwang | G06F 3/04886 |
| 2019/0006927 A1* | 1/2019 | Lee | H02K 33/18 |

* cited by examiner

DAMPING FOR A HAPTIC ACTUATOR

TECHNICAL FIELD

This patent document relates to haptic actuators, and more particularly to the damping of haptic actuators.

BACKGROUND

Haptic effects are used to enhance the interaction of an individual with an electronic device. Haptic effects enable the user to experience a touch or tactile sensation, which is typically generated by a haptic output device. Such devices commonly have a haptic actuator that drives or causes a mass to move back and forth to create a vibration. In operation, a haptic signal is applied to a haptic actuator causing it to move or vibrate. In turn, the haptic actuator causes the mass to move and generate a vibration. To stop the vibration, the haptic signal is ended and a braking pulse or signal is then applied to the haptic actuator. The braking pulse or signal is out of phase, typically a 180° out of phase, from the haptic signal. It urges the haptic actuator to reverse direction, which causes movement of the actuator and haptic mass to stop.

A problem with such haptic output devices is that the mass can have a tail vibration in which the haptic actuator continues vibrating or moving for a period of time after the event associated with the haptic event ends. The haptic effect lasts longer than desired. As a result such braking techniques are not effective for generating haptic effects having a very short duration.

SUMMARY

One aspect of this patent document is directed to an apparatus for damping haptic vibrations. A haptic output device is positioned within a device housing. The haptic output device has a haptic actuator and a haptic mass, the haptic mass being movable relative to the housing. A damper is positioned within the device housing. A controller is programmed to generate and deliver a haptic signal to the haptic actuator at a first time, and to generate and deliver a damping signal to the damper at a second time, the second time occurring after the first time.

Another aspect of this patent document is directed to a method of damping haptic vibrations. The method comprises moving a haptic mass, the haptic mass position in a housing; vibrating the housing in response to moving the haptic mass; damping movement of the haptic mass after a period of time; and substantially eliminating vibration of the housing in response to damping movement of the haptic mass.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

Values and structures disclosed herein are approximations and can vary because of various factors such as environmental factors, tolerances and margins of error in manufacturing processes and equipment, the performance of different materials, wear and tear of devices, and other factors. Example terms of approximation include "about," "approximately," and "substantially."

In general terms, this patent document relates to damping movement of a haptic actuator to reduce or eliminate movement or vibration of a haptic output device. Damping can be reducing or completely stopping movement of the actuator. An advantage of the embodiments disclosed herein is that they enable damping the haptic actuator very quickly so that very short haptic effects can be generated. Application for which very short haptic effects can be useful include simulating or emulating a button or switch that has a very short tactile sensation such as a click. Another example is the tactile sensation to simulate the bounce of a ball.

Many other applications for generating haptic effect are possible. For example, the embodiments disclosed herein also can be used with haptic effects having a longer duration. The damping can be gradually increased or decreased to provide a sense of linear motion, rotation, acceleration, deceleration, or going up or down a hill. In yet other examples, the damping can vary as the electronic device senses gestures either through a user interface such as a touch screen or free space gestures. The damping can also vary as the electronic device moves through the six degrees of freedom (6DOF) of: (1) up and down; (2) left and right; (3) forward and backward; (4) yaw (rotation or movement around a vertical axis); (5) pitch (rotation or movement around a horizontal axis); and (6) roll (rotation or movement around the orthogonal horizontal axis). The damping can vary by increasing the damping, decreasing the damping, stepping up or down the damping, modulating the damping, oscillating the damping, other changes in the length or amplitude of the damping, and combinations thereof. This type of control over damping gives a haptic developer much greater flexibility when designing haptic effects.

As used herein, the haptic actuator can be any actuator that has mechanical movement including haptic actuators that control movement of a haptic mass. Examples of haptic actuators include mechanisms such as motors; linear actuators such as solenoids; magnetic or electromagnetic mechanisms; and smart materials such as shape memory alloys, piezoelectric materials, electroactive polymers, and materials containing smart fluids.

The haptic actuators disclosed herein and used with damping mechanisms include piezoelectric actuators that have a piezoelectric transducer that drives cymbals to amplify vibration of the piezoelectric transducer and Linear Resonant Actuator (LRA) in which a mass attached to a spring is driven back and forth.

However, damping mechanisms such as those disclosed herein can be used with any type of haptic actuator that produces mechanical movement. Other examples include other types of piezoelectric actuators, other types of LRA's, solenoid resonant actuators (SRA), electromagnetic actuators, motors or smart materials that drive an Eccentric Rotating Mass (ERM), smart material materials (such as electro-active polymers or shape memory alloys) that move when exposed to or stimulated by external forces, voice coil actuators, electro-active polymer (EAP) actuators, moving magnet actuators, smart gels, deformable surfaces, or any other haptic output device or collection of components that have mechanical movement to cause a haptic output device to vibrate.

Additionally, the haptic actuators and damping mechanisms disclosed herein can be used with any electronic device in which it is desirable to have haptic effects. Examples include cell phones, smart phones, game controllers, tablet computers, calculators, game counsels, haptically-enabled wearable devices, medical devices, medical monitors, safety equipment, GPS devices, automobile components, glasses, helmets, wristwatches, smart watches, and any other electronic device.

Figure 1:
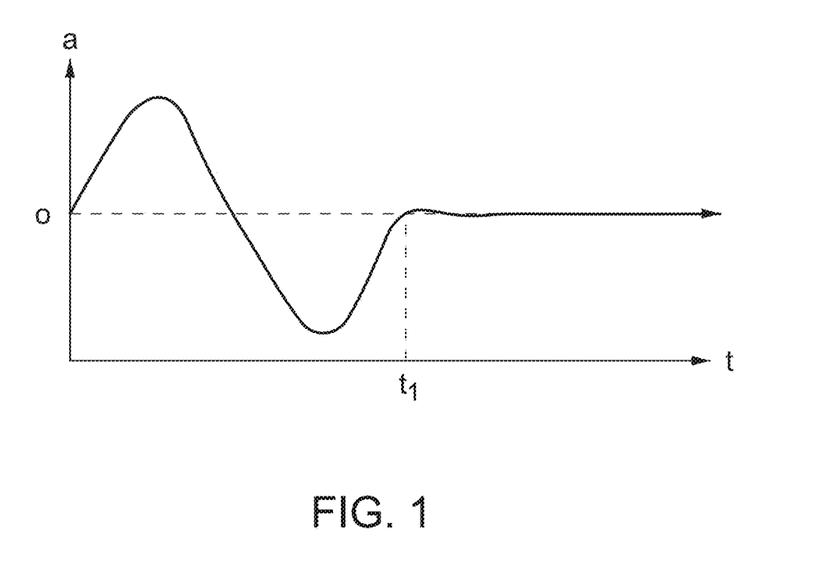
FIG. 1 is a curve illustrating movement of a haptic mass v. time with the haptic mass being dampened at the time $t_1$.

FIG. 1 is a chart that plots movement of a haptic actuator before and after damping. The chart plots the amplitude, a, of the haptic actuator as it moves versus time. Damping begins at time $t_1$. The amplitude value of 0 along the amplitude axis of the chart is the position of the actuator at which it is in its natural or resting state. The embodiments disclosed herein can be configured and programmed so that the period between a time of zero (0) and time $t_1$ has any desired or determined value. In one possible example, the time $t_1$ is 15 microseconds. Alternatively, movement of the haptic actuator can be dampened to reduce, but not entirely eliminate movement. In still other embodiments, movement of the haptic actuator is controlled to increase and decrease damping of the haptic actuator at different points in time to create different haptic effects.

Figure 2:
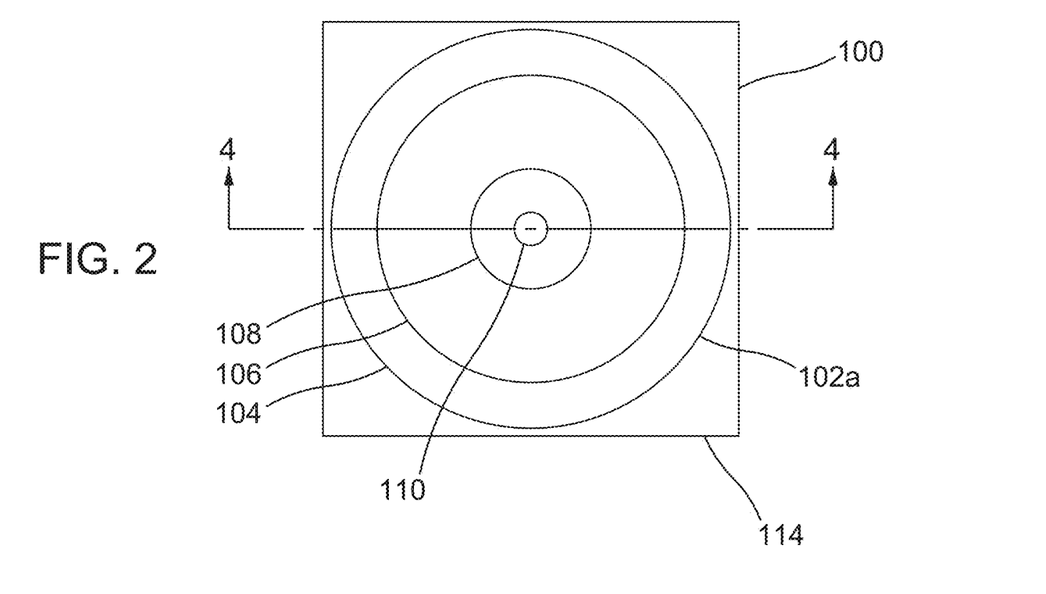
FIG. 2 is a top plane view of a haptic actuator having a cymbal.
Figure 3:
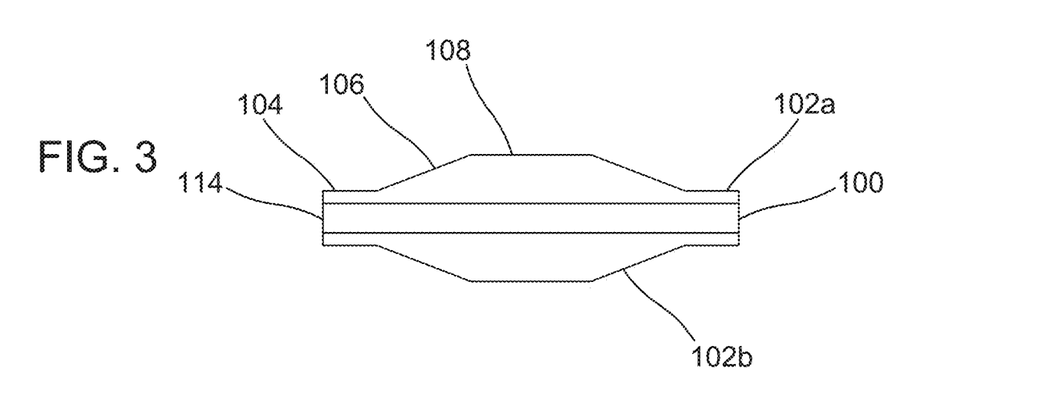
FIG. 3 is a side view of the haptic actuator illustrated in FIG. 2.
Figure 4:
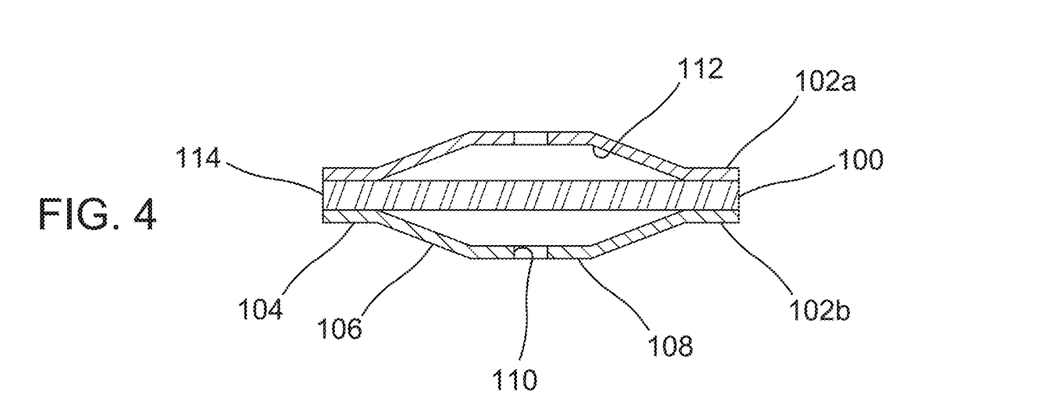
FIG. 4 is a cross-section view of the haptic actuator illustrated in FIG. 2 taken along a line 4-4.

FIGS. 2-4 illustrate a haptic actuator 100 having a piezoelectric transducer 114 positioned between opposing cymbals 102a and 102b. Each symbol has an edge 104, a bow 108, and a taper 106 leading between the edge 104 and the bow 108. Additionally, a cavity 112 is defined between each cymbal 102a and 102b and the piezoelectric transducer 114. Each cymbal 102a and 102b also has a port 110 in its bow 108 that is in fluid communication with the cavity 112. In operation, when an electrical or haptic signal is applied to the piezoelectric transducer 114, it will move or flex causing it to vibrate. The cymbals 102a and 102b amplify the vibrations and can be made of any suitable material such as a metal. An example of the haptic actuator 100 illustrated in FIG. 2 is commercially available from TDK U.S.A. Corporation of Uniondale, N.Y. under the commercial name PowerHap™.

Figure 5:
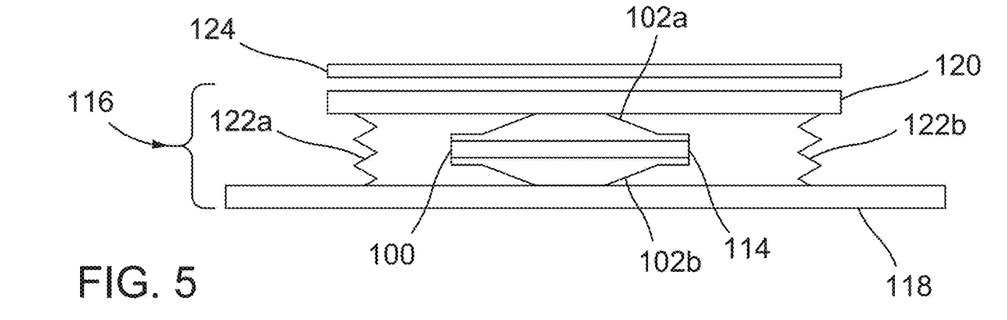
FIG. 5 is a side view of a haptic output device having the haptic actuator illustrated in FIGS. 2-4 and a damping device.

FIG. 5 illustrates a haptic output device 116 having a fixed base 118, haptic mass 120, springs 122a and 122b, a damping mechanism 124, and the haptic actuator 100. In this embodiment, the fixed base 118 is in a fixed or unmovable position relative to other components of the haptic output device 116 and in a fixed position relative to the electronic device in which the haptic output device 116 is mounted. The haptic mass 120 is operably connected to the fixed base 118 by springs 122a and 122b. The haptic actuator 100 is positioned between the fixed base 118 and moving mass 120. Cymbal 102b is oriented toward and operably connected to the fixed base 118, and cymbal 102a is oriented towards and operably connected to the moving mass 120. The haptic output device 116 is mounted in an electronic device.

The damping mechanism 124 is positioned proximal to the moving mass 120. In example embodiments, the damping mechanism 124 is positioned very close to, but not in contact with, the moving mass 120. In other alternative embodiments, the electromagnetic damper 124 can have other positions relative to the moving mass 120 so long as it is able to control movement of the moving mass 120 and of the haptic actuator 100.

Also in an example embodiment, the damping mechanism 124 includes electrical coils to form an electromagnetic damping mechanism. The moving mass 120 includes a ferrous material that is attracted to or repelled by a magnetic field. In operation, the piezoelectric transducer 114 of the haptic actuator 100 receives an electrical signal or haptic drive signal, which causes it to vibrate. Cymbals 102a and 102b amplify the vibration and cause the haptic mass 120 to move relative to the fixed base 118. The moving mass 120 vibrates and causes the electronic device in which the haptic output device 116 is mounted to also vibrate. After a determined event such as the passing of a predetermined period of time, the damping mechanism 124 is energized. If the damping mechanism 124 includes an electromagnetic coil, an electrical current is applied to the coil which then generates a magnetic field that either attracts or repels the moving mass 120 and causes it to stop moving or vibrating. Whether the magnetic field attracts or repels the moving mass 120 depends on the direction of the electric current through the electromagnetic coil and the resulting orientation of the magnetic field. Alternatively, the electromagnetic damper 124 is positioned to exert its magnetic field directly on the haptic actuator 100 either in addition to, or instead of, exerting the magnetic field against the haptic mass 120.

In other embodiments, the damping mechanism 124 has a mechanism other than, or in addition to, an electromagnetic coil to stop movement of the haptic mass 120 or haptic actuator 100. For example, the damping mechanism 124 can have a material or transducer that generates an electric field and the moving mass 120 can have a material that is urged to move in a determined direction when exposed to an electric field.

In an alternative embodiment, the cavities 112 of one or both of the cymbals 102a and 102b is filled with a smart fluid that changes viscosity when exposed or stimulated by an external force such as a magnetic field, electric field, electric current, or voltage. In an example embodiment, the viscosity of the smart fluid when it is not stimulated is in the range from about 1 mPa·s to about 100 mPa·s, and the viscosity of the smart fluid when it is stimulated is in the range from about 100 mPa·s to about 10,000 mPa·s.

One example of a smart fluid is a ferrofluid such as a magnetorheological fluid (MRF). An MRF is a fluid that has macro-sized magnetic particles suspended in a medium fluid. The magnetic particles can be selectively polarized by exposing them to a magnetic field. In a non-magnetized state, the magnetic particles are randomly disbursed in the medium fluid. The greater the magnetic field, the more viscous the MRF; and the lower the magnetic field, the less viscous the MRF. In the absence of a magnetic field, the MRF will provide minimal damping to the movement or vibration of the haptic actuator 100.

When the MRF is exposed to a magnetic field from the coils in the damping mechanism 124, the MRF enters a magnetized state and the magnetic particles develop magnetic dipole moments and become polarized. The polarized particles align themselves in columns in the general direction of the flux lines for the magnetic field. Aligning the magnetic particles increases viscosity of the MRF or makes the MRF less compressible. The greater the viscosity of the MRF the greater the dampening effect on the haptic actuator 100 against movement or vibration. As the strength of the magnetic field increases, the dipole moment of the magnetic particles also increases, which in turn increases the attraction between the magnetic particles. This increased attraction further increases the viscosity of the MRF and further increases the damping effect on movement or vibration of the haptic actuator 100. As the strength of the magnetic field decreases, the dipole moment of the magnetic particles also decreases, which in turn decreases the attraction between the magnetic particles. This decreased attraction decreases viscosity of the MRF and decreases the damping effect of the MRF. In this embodiment, the damping mechanism 124 and haptic actuator 100 can be tuned to deliver a desired damping response by adjusting the strength or magnitude of the magnetic field. The greater the magnetic field, the more viscous the MRF; and the lower the magnetic field, the less viscous the MRF.

Another example of a smart fluid is an electrorheological fluid that is stimulated to change viscosity when exposed to an electric field. Other embodiments might use yet other types of smart fluids and may be stimulated by other types of forces other than magnetic fields or electric fields.

Figure 6:
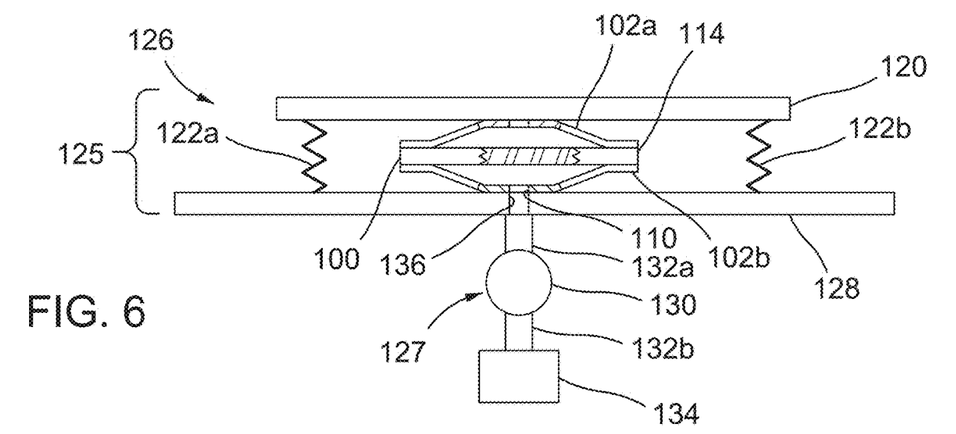
FIG. 6 is a side view of the haptic output device illustrated in FIG. 5 with an alternative damping device.

FIG. 6 is an alternative embodiment of a haptic output device and a damping mechanism. In this embodiment, a haptic output device 125 is substantially similar to haptic output device 116 and includes a fixed base 128, moving mass 120, springs 122a and 122b, and haptic actuator 100. Fixed base 128 defines a fluid duct 136 that is in fluid communication between an outer surface of the fixed base 128 and the port 110 defined in cymbal 102b and the cavity 112. The damping mechanism 125 includes a pump 130, a reservoir 134 holding a damping fluid, a conduit 132a in fluid communication between the pump 130 and the fluid duct 136, and a conduit 132b in fluid communication between the reservoir 134 and the pump 130. The damping fluid can be any fluid that is suitable to flow easily between the reservoir 134 and the cavity 112, and to dampen movement of the cymbal 102b and the piezoelectric transducer 114.

To dampen vibration or movement of the actuator 100, the pump 130 pumps fluid from the reservoir 134 into the cavity 112 of cymbal 102b. The fluid slows or stops vibration of the cymbal 102b and piezoelectric transducer 114, which in turn stops movement of the moving mass 120, which in turn stops vibration of the haptic output device 125, which in turn stops vibration of the electronic device. After damping movement of the haptic actuator 100, the pump 130 reverses flow and removes, drains, or exhausts the damping fluid from the cavity 112 so the haptic actuator 100 can again be actuated and caused to move or vibrate.

The pump 130 can be any type of mechanism, electrochemical process, capillary mechanism, or other phenomenon or action that can cause fluid to flow. Examples of such pump mechanisms and processes include electrodes, magnetic and electrostatic mechanisms, electrochemical reactions, mechanical mechanisms, microelectromechanical (MEMS) mechanisms, nanoelectromechanical scale (NEMS) mechanisms, or any other type of thing or process that moves fluids or smart fluid between the reservoir 134 and the cavity 112 or causes such fluid to move between the reservoir 134 and cavity 112. A smart fluid can operate as the damping fluid.

Alternative embodiments can use different configurations of pumps, one or more pumps, or other mechanisms to move and store the damping fluid in an effort to dampen movement of the haptic actuator 100. Other alternative embodiments can pump fluid into the cavities 112 of both cymbals 102a and 102b, which may provide a stronger damping or quicker damping response time. Such alternative embodiments can include two pumps and reservoir assemblies, two pumps and a single reservoir assembly, or just a single pump and two fluid passages from the single pump to the ports 110 of both cymbals 102a and 102b. Yet another embodiment would include a port through the piezoelectric transducer 114 to provide fluid communication between the cavities 112 defined by both cymbals 102a and 102b.

Figure 7:
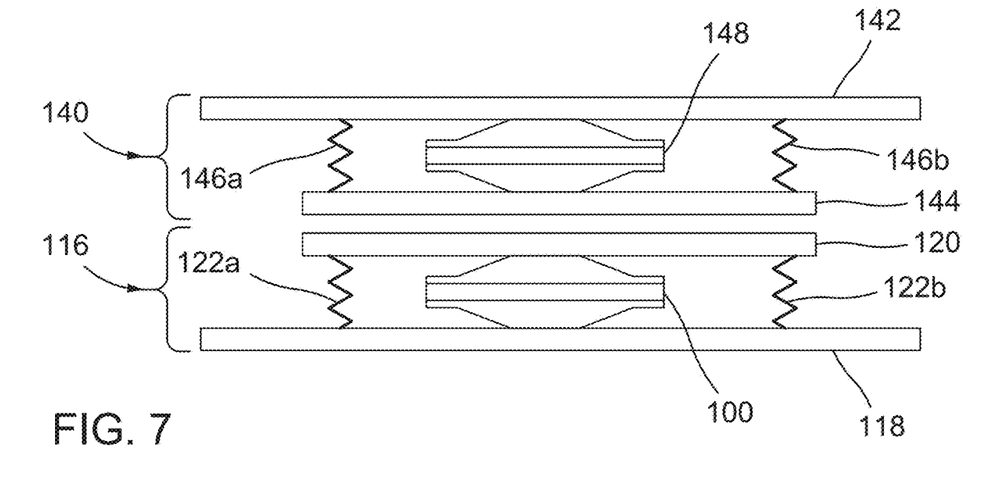
FIG. 7 is a side view of the haptic output device illustrated in FIGS. 5 and 6 with an alternative damping device.

FIG. 7 illustrates an alternative embodiment of a damping mechanism 140. In this embodiment, the damping mechanism 140 is substantially similar to the haptic output device 116 and includes a fixed base 142, a moving mass 144, springs 146a and 146b, and damping actuator 148. In the illustrated example, the damping mechanism 140 is orientated so the moving mass 144 opposes the moving mass 120. The damping actuator 148 is operated so that the moving mass 144 vibrates out of phase with the moving mass 120. In an example embodiment, movement of the moving mass 144 is 180° out of phase with the moving mass 120. In other embodiments, the phase difference between movement of moving mass 144 and moving mass 120 is less than 180° and greater than 0°.

Although the damping mechanism 140 is illustrated as directly opposing the haptic output device 116, other embodiments have different arrangements of the haptic mechanism 140 and haptic output device 116. For example, the damping mechanism 140 and haptic output device 116 can be spaced farther or closer apart, positioned side-by-side, offset from one another, or oriented so that the moving masses 120 and 144 are parallel and face in the same direction or are at an angle relative to one another. In yet other embodiments, the damping mechanism 140 and haptic output device 116 are in different positions in the electronic device.

In the illustrated embodiment, the damping actuator 148 and the haptic actuator 100 are the same type of actuator. In other embodiments, the damping actuator 148 is a different kind of actuator than the haptic actuator 100.

Figure 8:
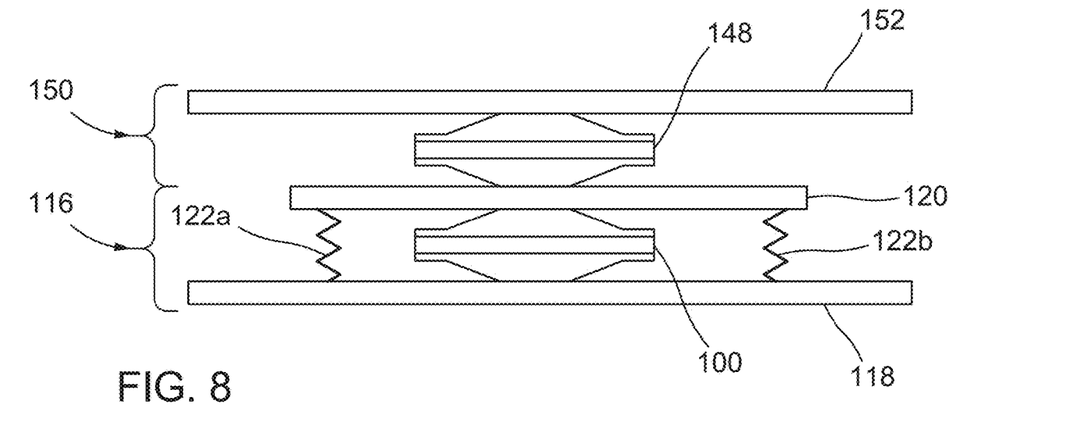
FIG. 8 is a side view of the haptic output device illustrated in FIGS. 5-7 with an alternative damping device.

FIG. 8 illustrates a damping mechanism 150 substantially similar to damping mechanism 140. In this embodiment, the damping mechanism 150 does not have a moving mass. The damping mechanism 150 is positioned on an opposite side of the moving mass 120 from the haptic actuator 100. When activated, the damping actuator 148 urges the moving mass 120 to move in an opposite direction than the haptic actuator 100. Urging movement of the moving mass 120 in opposite directions dampens movement of the haptic mass, which in turn dampens movement of vibration of the haptic actuator 100 and the haptic output device 116.

Figure 9:
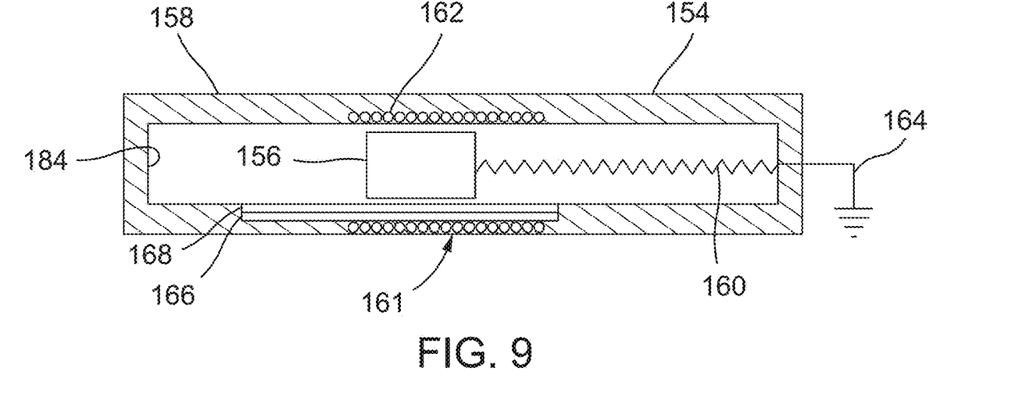
FIG. 9 is a side cross-sectional view of a haptic output device having a linear resonant actuator and a damping device.

FIG. 9 illustrates an LRA 154 having a haptic mass 156, housing 158, spring 160 and magnetic coil 162. The housing defines a cavity 184. The haptic mass 156 includes a ferrous material, and is positioned in the cavity 184. The spring 160 is connected between the haptic mass 156 and the housing 158. The spring 160 urges the haptic mass 156 to a resting position 161 at an intermediate location the length of the housing 158. The magnetic coil 162 is wrapped around the cavity 184 along the path of travel of the haptic mass 156 and extends along both sides of the resting position 161 of the haptic mass 156. In use, the magnetic coil 162 is energized and generates a magnetic field that extends through the cavity 184 and along the length of the housing 158. The magnetic field urges the moving mass 156 in one direction, either extending or compressing the spring 160. After the moving mass 156 moves a determined distance, the force of the spring 160 urges against the moving mass 156 to move in an opposite direction. As the moving mass 156 moves in the opposite direction a predetermined distance, the haptic mass 156 will reverse direction again. The back and forth motion of the haptic mass 156 causes the haptic actuator 154 to vibrate. In an alternative embodiment, the electrical insulator is on the surface of the haptic mass 156.

The damping mechanism uses electro-adhesion to dampen movement of the haptic moving mass 156 and includes an electrical ground 164, electrode 166, and electrical insulator 168. The haptic mass 156 is electrically conductive and is electrically connected to the electrical ground 164. In operation, the electrode 166 is energized and creates a voltage potential between the electrode 166 and the haptic mass 156. The haptic mass 156 is urged toward the electrode 166 and creates friction between the haptic mass 156 and the housing 158. The friction dampens movement of the haptic mass 156 and stops or slows movement of the haptic mass 156, which comes to a stop at the resting position 161 and stops the haptic actuator 154 from vibrating.

Figure 10:
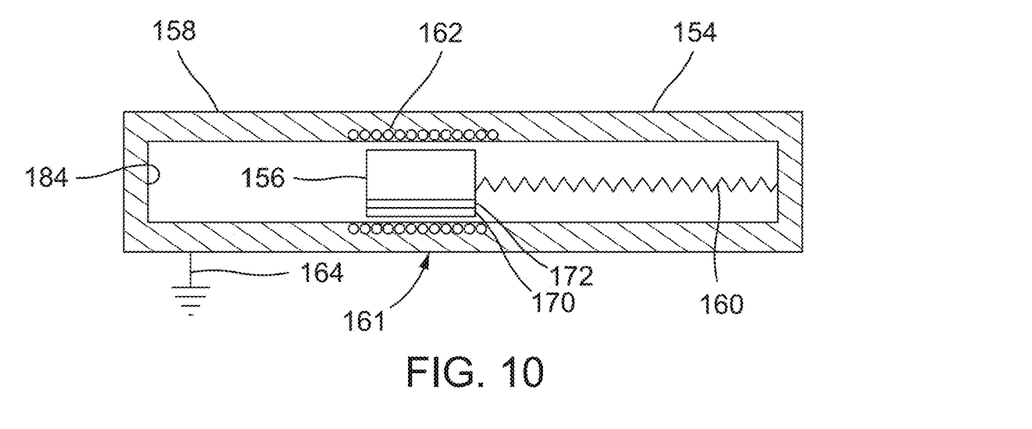
FIG. 10 is a side cross-sectional view of the haptic output device illustrated in FIG. 9 with an alternative damping device.

FIG. 10 illustrates an alternative damping mechanism for LRA 154. In this embodiment, the damping mechanism includes the electrical ground 164, and electrode 172 and an electrical insulator 170. However, the housing 158 is electrically connected to ground 164. The electrode 172 and electrical insulator 170 are mounted on the moving mass 156. The electrode 172 is in electrical communication with a power supply through the spring 160. The electrical insulator 170 is positioned between the electrode 172 and the housing 158. Alternatively, the electrical insulator 170 can be operably connected to the housing 158 proximal the cavity 184 instead of on the moving mass 156. The damping mechanism illustrated in FIG. 10 operates in substantially the same way as the damping mechanism illustrated in FIG. 9 and discussed herein.

Still other embodiments use an electromagnet damping mechanism similar to damping mechanism 124 illustrated in FIG. 5 used to dampen movement of the haptic mass 156 in the LRA. In these embodiments, an electromagnet is positioned at the end of the housing 158 in line with movement of the haptic mass 156. When the electromagnet is energized, the resulting magnetic field attracts the haptic mass 156 toward the end of the housing 158 and either stops or slows movement of the haptic mass 156. Alternatively, the electromagnet is positioned along the side of the housing 158 and extends parallel to movement of the haptic mass 156. When the electromagnet is energized in these embodiments, it urges the haptic mass 156 against the side of the housing 158 creating friction or adhesion to slow or stop movement of the haptic mass 156. In yet other embodiments, the damping mechanism can include both an electromagnet and the electro-adhesion (e.g., the electrode, insulator, and ground arrangement).

In yet other embodiments, the cavity 184 is filled with a smart fluid that changes viscosity when exposed or stimulated by an external force such as a magnetic field, electric field, electric current, or voltage. In this embodiment, the damping mechanism would include an electromagnet, electrode, or other transducer that can generate an external force and is positioned to apply the generated external force to the fluid in the cavity 184.

Figure 11:
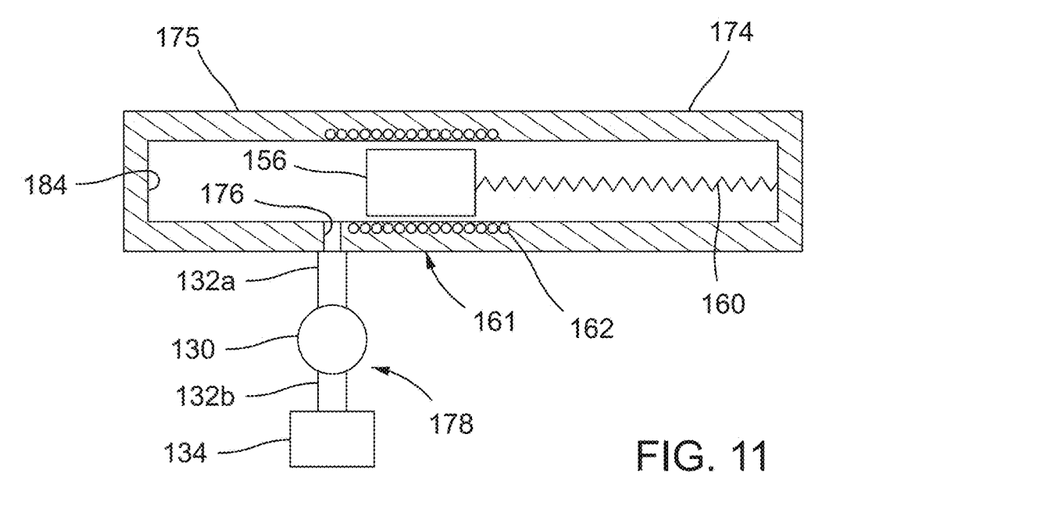
FIG. 11 is a side cross-sectional view of the haptic output device illustrated in FIGS. 9 and 10 with an alternative damping device.

FIG. 11 illustrates another alternative embodiment of an LRA 174 and damping mechanism 178. In this embodiment, the LRA 174 is substantially similar to the LRA 154, and includes a haptic mass 156, spring 160, coil 162, and housing 175. Housing 175 defines the cavity 184. The damping mechanism 178 is substantially similar to the damping mechanism 127 and includes reservoir 134 filled with a damping fluid, pump 130, conduit 132b in fluid communication between the reservoir 134 and the pump 130, and conduit 132a in fluid communication between the pump 130 and the fluid doctor 176. The damping mechanism 178 operates in a substantially similar way as damping mechanism 127, but pumps damping fluid into and out of cavity 184.

Alternative embodiments can use combinations of the haptic actuators and damping mechanisms other than the combinations disclosed herein. Additionally, damping mechanisms can be used with haptic actuators other than the actuators disclosed herein. Yet other embodiments can use different types of damping mechanisms in addition to or in place of the damping mechanisms disclosed herein.

Figure 12:
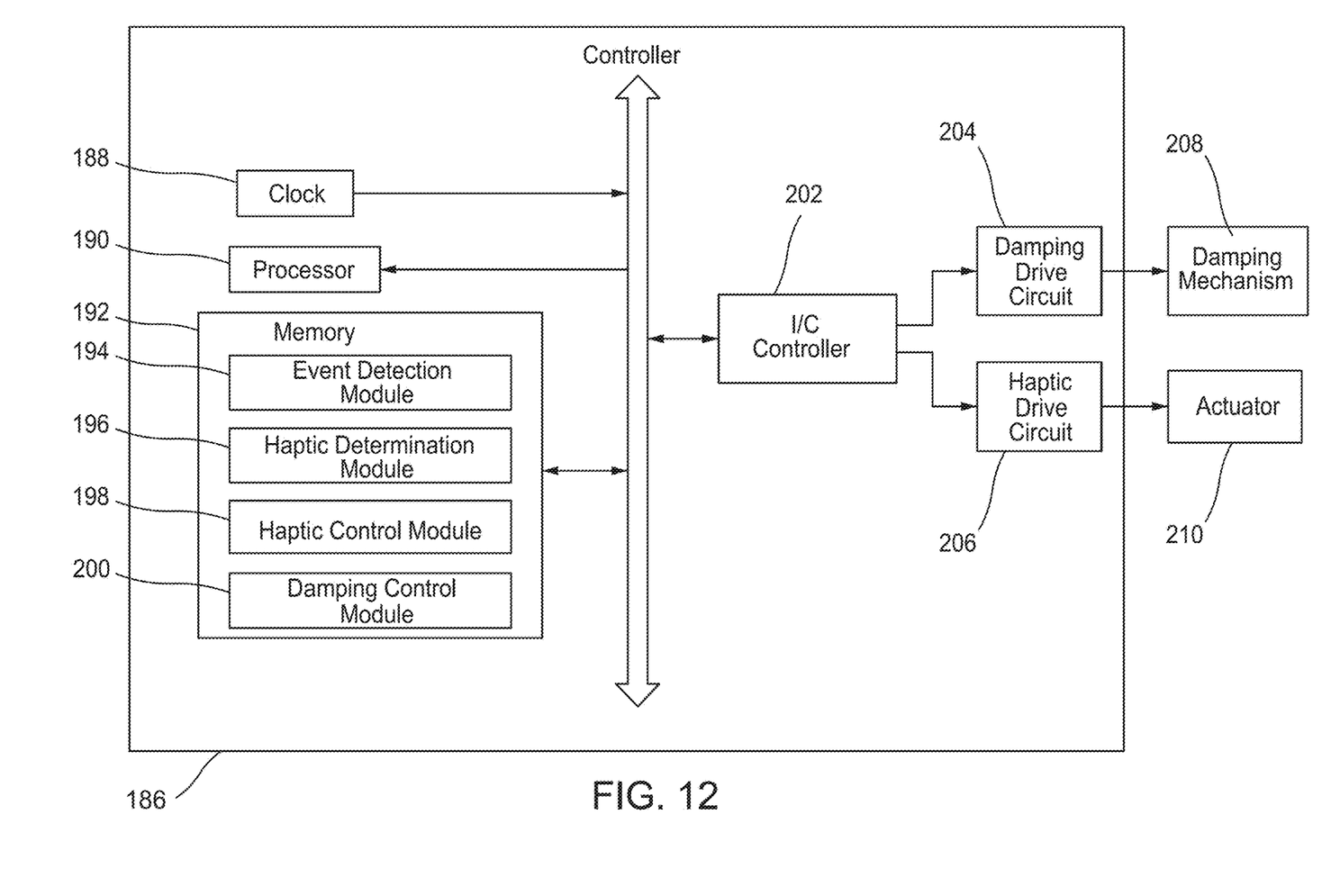
FIG. 12 is a functional block diagram of a controller for operating the haptic actuators and damping devices illustrated in FIGS. 1-11.

Referring now to FIG. 12, a controller 186 for the haptic actuators 210 and damping mechanisms 208 disclosed herein includes a bus 214, a processor 190, an input/output (I/O) controller 202, memory 192, a clock 188, a haptic drive circuit 206, and a damping drive circuit 204. The bus 214 couples the various components of the controller 186, including the I/O controller 202 and memory 192, to the processor 190. The bus 214 typically comprises a control bus, address bus, and data bus. However, the bus 214 can be any bus or combination of busses suitable to transfer data between components in the controller 186.

The processor 190 can comprise any circuit configured to process information and can include any suitable analog or digital circuit. The processor 190 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor 190 can comprise a single unit, or a combination of two or more units, with the units physically located in a single controller or in separate devices.

The I/O controller 202 comprises circuitry that monitors the operation of the controller 186 and peripheral or external devices. The I/O controller 202 also manages data flow between the controller 186 and peripherals or external devices (not shown). The external devices can reside in the same article or device in which the controller 186 and haptic actuator 210 are incorporated or can be external to the system. Examples of other peripheral or external devices with which the I/O controller 202 can interface include sensors, external storage devices, monitors, input devices such as keyboards, mice or pushbuttons, external computing devices, mobile devices, transmitters/receivers, and antennas.

The haptic drive circuit 206 receives instructions from the processor 190 as described in more detail herein and generates haptic drive signals that are then applied to the haptic actuator 210. Similarly, the damping drive circuit 204 receives instructions from the processor 190 and generates damping signals that are applied to the damping mechanism 208. In at least some embodiment, the delay between generation of the damping signal and the haptic signal is greater than 0 seconds and less than about 20 mS. In other embodiments, the delay is less than about 10 mS. In other embodiments, the delay is about 15 mS. Additionally, the damping signal is out of phase from the haptic signal. For example, the damping signal can be about 180° out of phase from the damping signal. In other embodiments the phase shift of the damping signal from the haptic signal is greater than 0° and less than 180°.

The clock 188 generates periodic signals used to synchronize operation of the various hardware components in the controller 186. As disclosed in more detail herein, the clock 188 also can be used to measure time intervals used to coordinate operation of the haptic actuator 210 and damping mechanism 208.

The memory 192 can comprise volatile memory such as random access memory (RAM), read only memory (ROM), electrically erasable programmable read only memory (EEPROM), flash memory, magnetic memory, optical memory or any other suitable memory technology. The memory 192 can also comprise a combination of volatile and nonvolatile memory.

The memory 192 is configured to store a number of program modules for execution by the processor 190, including a haptic detection module 194, a haptic effect determination module 196, a haptic effect control module 198, and a damping control module 200. Each program module is a collection of data, routines, objects, calls and other instructions that perform one or more particular tasks. Although certain program modules are disclosed herein, the various instructions and tasks described for each module can, in various embodiments, be performed by a single program module, a different combination of modules, modules other than those disclosed herein, or modules executed by remote devices that are in communication with the controller 186.

Depending on the environment and application in which the controller 186 is used, the event detection module 194 is programmed to receive data from various devices such as sensors, antennas, accelerometers or other positioning sensors, 2D and 3D cameras, and remote devices. The event detection module 194 also can receive data such as flags or instructions from programs such as video games, monitoring software, telephone software, and other types of application.

Upon receiving the data, the event detection module 194 determines whether there is an event, condition, or operating state associated with a haptic effect or the damping of a haptic effect.

In an example embodiment, the haptic effect determination module 196 determines when to deliver a haptic effect. If the controller 186 is programmed to deliver different haptic effects, the haptic effect determination module 196 also determines which haptic effect to deliver. An example technique that the haptic effect determination module 196 can use to determine which haptic effect to deliver includes rules programmed to make decisions to select a haptic effect. For example, the controller 186 may interface with a cell phone, gaming device, GPS receiver, medical device, or any other device or software and determine different haptic effects that should be delivered.

Upon the haptic effect determination module 196 determining which haptic drive signal to deliver to the haptic actuator 210 and communicates that determination to the haptic effect control module 198. The haptic effect control module 198 obtains the electrical parameters, properties, or characteristics that correspond to the determined haptic effect. The haptic effect control module 198 communicates the electrical parameters to the I/O controller 202, which outputs them to the actuator drive circuit 206. The actuator drive circuit 206 has a signal generator in series with an amplifier, which then generates a haptic drive signal embodying the electrical parameters provided by the haptic effect control module 198. The actuator drive circuit 206 applies the haptic drive signal to the haptic actuator 210.

Examples of signal parameters that can be used to generate the haptic drive signal include frequency, amplitude, phase, inversion, duration, waveform, attack time, rise time, fade time, and lag or lead time relative to an event. Additionally, examples of signals and waveforms for the haptic drive signal include direct current signals, alternating current signals, square waves, sinusoidal waves, step signals, triangle waves, sawtooth waves, and pulses. Additionally, the haptic drive signal can have a voltage in the range from about 2 V to about 10 V, and an electrical current in the range of about 0.1 mA to about 0.5 mA. In alternative embodiments, the haptic drive signal can have a voltage below 2 V or above 10 V and a current below 0.1 mA or above 0.5 mA. The frequency of the haptic drive signal can be in the range from about 210 Hz to about 250 Hz. In alternative embodiments, the frequency can be below 210 Hz or above 250 Hz. In alternative embodiments, the haptic drive signal has a voltage or frequency outside of these ranges. Additionally, the desired voltage and frequency of the haptic drive signal can vary depending on the structure of the actuator and the type of materials used in the actuators and the structure used to support the haptic mass 120 in the void 108.

In an alternative embodiment, there is no determination of the haptic effect to be delivered through the haptic actuator 210 or the electrical parameters to use for generating the haptic drive signal. In such an embodiment, the controller 186 is simply programmed, or even hard wired, to deliver a determined haptic drive signal to the haptic actuator 210.

The damping control module 200 determines when to actuate the damping mechanism 208. The damping control module 200 can determine when to actuate the damping mechanism 208 based on different criteria. For example, the damping control module 200 can monitor the clock 188 and instruct the damping drive circuit 204 to generate a damping signal a determined time after the haptic drive circuit 206 is instructed to generate a haptic signal. In another example, the damping control module 200 can monitor a device such as a sensor and determine when to instruct the damping drive circuit 204 to generate a damping signal based on input received from the sensor. In yet another example, the damping control module 200 can monitor a software application and determine when to instruct the damping drive circuit 204 to generate a damping signal based on data received from the software.

In example embodiments, the damping control module 200 obtains the electrical parameters, properties, or characteristics that correspond to a determined damping signal. The damping control module 200 communicates the electrical parameters to the I/O controller 202, which outputs them to the damping drive circuit 204. The damping drive circuit 204 has a signal generator in series with an amplifier, which then generates a damping signal embodying the electrical parameters provided by the damping module 200. In example embodiments, the haptic effect determination module 196 and damping determination module 200 coordinate execution to control and coordinate operation the haptic output device and the damping mechanism to generate and deliver different haptic effects.

The damping signal can be any type of signal that effecting operates the damping mechanism 208. For example, the damping signal can have a waveform similar to those disclosed herein for generating the haptic signal. The damping signal also can be a direct current signal. The damping signal can have an increasing or decreasing amplitude.

The embodiment illustrated in FIG. 12 is an open loop in that the controller does not receive any feedback of measurements or other information related to operation of the haptic output device 210 such as the velocity or position of the haptic actuator or haptic mass.

Figure 13:
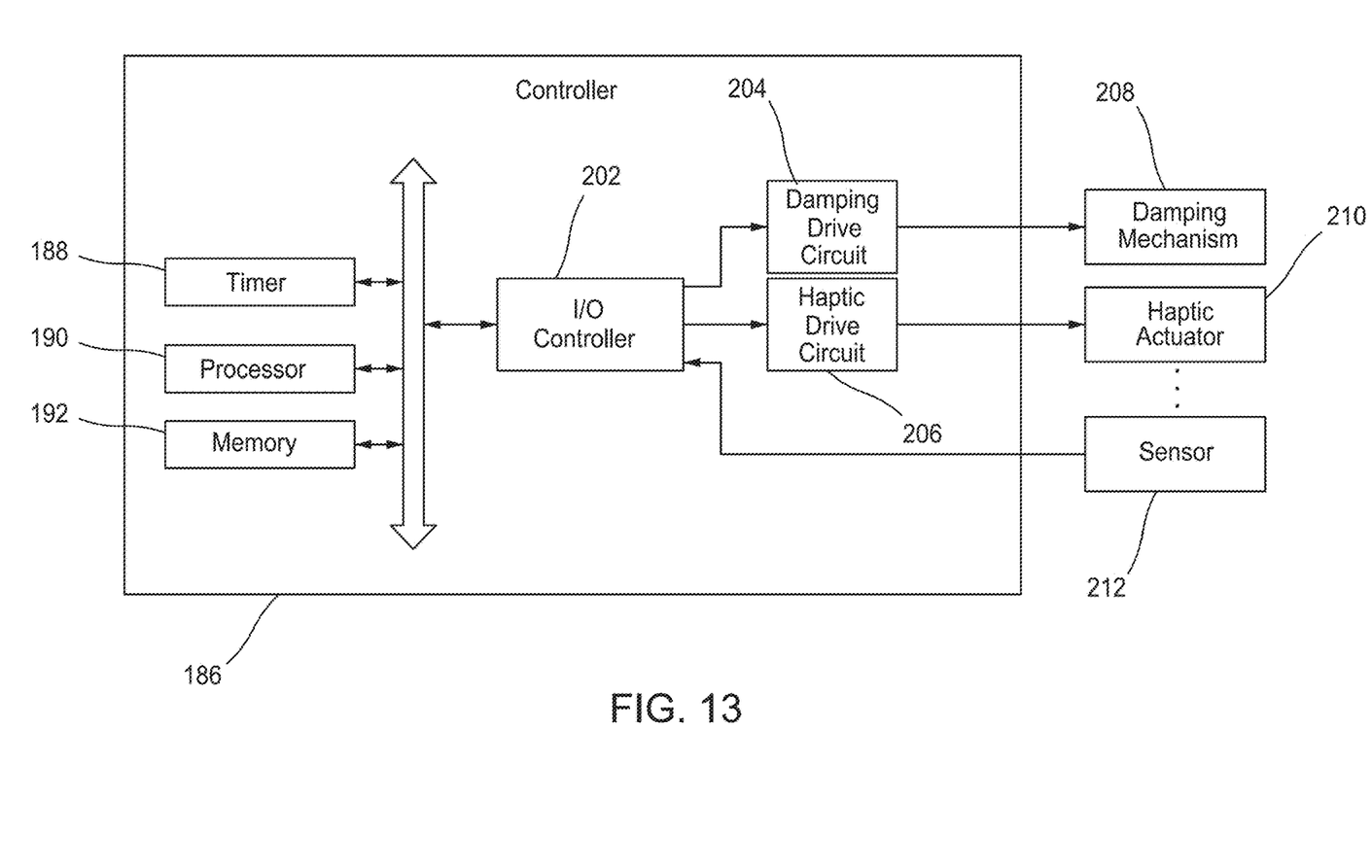
FIG. 13 is a functional block diagram of the controller illustrated in FIG. 12 receiving an input from a sensor.

FIG. 13 illustrates an alternative, closed-loop embodiment in which the controller 186 receives input from a sensor 212 that monitors the haptic actuator 210 or movement of a mass operated by the haptic actuator 210. The controller 186 is substantially similar to the controller illustrated in FIG. 12. In an example application of this embodiment, the controller 186 and the damping control module 200 receives feedback from the sensor 212. The feedback includes measurements or other information related to a property of, or operation of, the haptic actuator or moving mass. Examples of such properties include velocity or acceleration of movement or position.

The damping control module 200 can use this feedback information, for example, to monitor how fast the haptic mass moves. The damping control module 200 then can control the damping drive circuit 204 to generate a damping signal upon sensing the velocity of the haptic mass has fallen below a determined value or increased above a determined value. In another example, the damping control module 200 can use the sensor 212 to monitor the number of oscillations that the haptic mass makes after the haptic actuator is actuated by the haptic drive circuit 206. The damping control module 200 can then control the damping drive circuit 204 to generate a damping signal. In yet other examples, the sensor 212 can monitor things or events other than movement of the haptic mass, and the damping control module 200 can then control the damping drive circuit 204 to generate a damping signal in response to the things or events being monitored by the sensor 212.

Additionally, the controller 186 and sensor 212 can be configured to have any suitable closed-loop control system. Example configurations for the controller 186 and sensor 212 include proportional integral derivative (PID), lead/lag, linear squared, linear, and nonlinear closed-loop control systems.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The pending claims are:

1. An apparatus for damping haptic vibrations comprising:
   a device housing;
   a haptic output device positioned within the device housing, the haptic output device having a haptic actuator and a haptic mass, the haptic mass being movable relative to the device housing;
   a damper, different from the haptic actuator, positioned within the device housing; and
   a controller programmed to generate and deliver a haptic signal to the haptic actuator at a first time, and to generate and deliver a damping signal to the damper at a second time, the second time occurring after the first time.

2. The apparatus of claim 1 wherein the haptic signal has a first phase and the damper signal has a second phase, the first phase being different than the second phase.

3. The apparatus of claim 2 wherein the second phase of the damper signal is approximately 180° out of phase from the first phase of the haptic signal.

4. The apparatus of claim 2 wherein:
   the haptic actuator causes the device housing to vibrate upon the controller delivering the haptic signal to the haptic actuator; and
   the damper substantially eliminates vibration of the device housing upon the controller delivering the damper signal to the damper.

5. The apparatus of claim 1 wherein a period between the first time and the second time is greater than about 0 mS and shorter than about 20 mS.

6. The apparatus of claim 5 wherein the period between the first time and the second time is about 15 mS.

7. The apparatus of claim 1 wherein the haptic actuator is selected from the group consisting of: a linear resonant actuator, a piezo haptic actuator and cymbal combination, or combinations thereof.

8. The apparatus of claim 1 wherein the haptic output device defines a void and the damper comprises a smart fluid positioned in the void, the smart fluid having a first viscosity when exposed to an external field and a second viscosity in the absence of the external field, the first viscosity being higher than the second viscosity, the fluid damping movement of the haptic mass when exposed to the eternal field.

9. The apparatus of claim 8 wherein the second viscosity is in the range of about 1 mPa and about 100 mPa, and the first viscosity is in the range of about 100 mPa and about 10,000 mPa.

10. The apparatus of claim 8 wherein the smart fluid is an electrorheological fluid and the external field is an electric field.

11. The apparatus of claim 8 wherein the smart fluid is a magnetorheological fluid and the external field is a magnetic field.

12. The apparatus of claim 8 wherein the haptic output device has a haptic output device housing, the haptic output device housing defining the void, the haptic mass being positioned in the void.

13. The apparatus of claim 8 wherein the haptic actuator comprises a piezo haptic actuator and a cymbal, the piezo haptic actuator and the cymbal cooperating to define the void.

14. The apparatus of claim 1 wherein the haptic output device defines a void and the damper comprises a fluid and a pump in fluid communication with the void.

15. The apparatus of claim 14 wherein the haptic output device has a haptic output device housing, the haptic output device housing defining the void, the haptic mass being positioned in the void.

16. The apparatus of claim 14 wherein the haptic actuator comprises a piezo haptic actuator and a cymbal, the piezo haptic actuator and the cymbal cooperating to define the void, the cymbal defining a port, the port in fluid communication with the pump.

17. The apparatus of claim 1 wherein:
the haptic mass comprises a ferrous material;
the damper comprises an electromagnet positioned proximal to the haptic mass; and
the damping signal energizes the electromagnet.

18. The apparatus of claim 17 wherein:
the haptic output device comprises a haptic output device housing and the electromagnet, haptic mass, and haptic actuator are located in the haptic output device housing.

19. The apparatus of claim 1 wherein:
the damper comprises a damping actuator and a damping mass, the damping actuator causing the damping mass to move upon the damper receiving the damping signal.

20. The apparatus of claim 19 wherein:
the damping actuator is arranged to move the damping mass in a direction; and
the haptic actuator is arranged to move the haptic mass in a substantially opposite direction.

21. The apparatus of claim 1 wherein:
the haptic actuator urges the haptic mass to move in a direction upon the haptic output device receiving the haptic signal; and
the damper comprises a damping actuator, the damping actuator arranged to urge the haptic mass in an opposite direction upon the damper receiving the damping signal.

22. The apparatus of claim 21 wherein:
the damping actuator is positioned to exert a force directly against the haptic mass.

23. The apparatus of claim 1 wherein:
the damper has an electrode positioned proximal to the haptic mass; and
the damping signal creates an electrical potential between the electrode and the haptic mass.

24. The apparatus of claim 23 wherein:
an electrical insulator is positioned between the electrode and the haptic mass; and
the haptic mass is electrically connected to ground.

25. The apparatus of claim 23 wherein:
the electrode is mounted on the haptic mass; and
the haptic output device has a haptic output device housing, and the haptic mass is positioned in the haptic output device housing, and the haptic output device housing is electrically connected to ground.

26. The apparatus of claim 25 wherein:
an electrical insulator is positioned between the electrode mounted on the haptic mass and the haptic output device housing.

27. The apparatus of claim 1 further comprising:
a sensor in electrical communication with the controller, the sensor positioned to sense movement associated with the haptic mass;
wherein, the sensor inputs a feedback signal into the controller, the feedback signal representing a characteristic of the movement of the haptic mass;
and wherein, the feedback signal has an electrical characteristic and the damping signal generated by the controller is a function of the electrical characteristic of the feedback signal.

28. The apparatus of claim 27 wherein:
the sensor is selected from the group consisting of an accelerometer, a position sensor, and combinations thereof.

29. The apparatus of claim 28 wherein:
the sensor senses movement of the haptic mass.

30. The apparatus of claim 29 wherein:
the sensor senses movement selected from the group consisting of position of the haptic mass, acceleration of the haptic mass, velocity of the haptic mass, and combinations thereof.

31. The apparatus of claim 28 wherein:
the sensor senses movement of the device housing.

32. The apparatus of claim 31 wherein:
the sensor senses movement selected from the group consisting of acceleration of the device housing, velocity of the device housing, and combinations thereof.

33. A method of damping haptic vibrations, the method comprising:
moving a haptic mass using a haptic actuator, the haptic mass positioned in a housing;
vibrating the housing in response to moving the haptic mass;
damping movement of the haptic mass after a period of time using a damper, the damper being different from the haptic actuator and positioned within the housing; and
substantially eliminating vibration of the housing in response to damping movement of the haptic mass.

34. The method of claim 33 further comprising:
generating a haptic signal having a phase and applying the haptic signal to the haptic actuator; and
generating a damper signal having a phase and applying the damper signal to the damper, the damper damping movement of the haptic mass, the phase of the damper signal being different than the phase of the haptic signal.

35. The method of claim 34 wherein a period of time between applying the haptic signal to a haptic actuator and applying the damper signal to the damper is greater than 0 mS and shorter than about 20 mS.

36. The method of claim 33 wherein:
a haptic output device comprises a housing, the haptic mass being positioned in the housing; and
damping movement of the haptic mass comprises inputting fluid into a void defined in the haptic output device.

37. The method of claim 33 wherein:
a haptic actuator is operably connected to the haptic mass, the haptic actuator defining a void; and
injecting fluid into the housing comprises injecting fluid into the void defined in the haptic actuator.

38. The method of claim 33 wherein:

a haptic output device comprises a housing, the haptic mass being positioned in the housing, and a smart fluid being positioned in the housing; and damping movement of the haptic mass comprises applying a field to the smart fluid, the field increasing viscosity of the smart fluid.

39. The method of claim 33 wherein:

a haptic actuator is operably connected to the haptic mass, the haptic actuator defining a void, and a smart fluid being positioned in the void; and damping movement of the haptic mass comprises applying a field to the smart fluid, the field increasing viscosity of the smart fluid.

40. The method of 33 wherein:

the haptic mass comprises a ferrous material; and damping movement of the haptic mass comprises exposing the haptic mass to a magnetic field.

41. The method of claim 40 wherein:

an electromagnet is positioned proximal to the haptic mass; and exposing the haptic mass to a magnetic field comprises energizing the electromagnet.

42. The method of claim 41 wherein:

damping movement of the haptic mass comprises generating an electrical potential between the haptic mass and the housing.

43. The method of claim 42 wherein:

generating an electrical potential between the haptic mass and the housing comprises applying an electrical charge to the haptic mass and applying an electrical ground to the housing.

44. A method of damping haptic vibrations, the method comprising:

moving a haptic mass, the haptic mass positioned in a housing;

vibrating the housing in response to moving the haptic mass;

damping movement of the haptic mass after a period of time; and substantially eliminating vibration of the housing in response to damping movement of the haptic mass;

wherein the haptic mass comprises a ferrous material, and damping movement of the haptic mass comprises exposing the haptic mass to a magnetic field;

wherein an electromagnet is positioned proximal to the haptic mass, and exposing the haptic mass to a magnetic field comprises energizing the electromagnet;

wherein a haptic output device includes a housing, the haptic mass being positioned in the housing, and damping movement of the haptic mass comprises generating an electrical potential between the haptic mass and the housing;

wherein generating an electrical potential between the haptic mass and the housing comprises applying an electrical charge to the haptic mass and applying an electrical ground to the housing;

and wherein moving the haptic mass comprises actuating a first haptic actuator, movement of the haptic actuator having a first phase, and damping movement of the haptic mass comprises actuating a second haptic actuator, movement of the second haptic actuator having a second phase, the second phase being different than the first phase.

45. The method of claim 44 wherein the second phase is shifted about 180° from the first phase.

\* \* \* \* \*